US012260532B2

(12) United States Patent
Liu et al.

(10) Patent No.: US 12,260,532 B2
(45) Date of Patent: Mar. 25, 2025

(54) LINEAR TRANSFORM OF UNDISTORTED IMAGE FOR FUSION

(71) Applicant: Apple Inc., Cupertino, CA (US)

(72) Inventors: Kaiming Liu, Cupertino, CA (US); Maxim Smirnov, San Jose, CA (US); William T. Warner, Sunnyvale, CA (US); David Pope, Campbell, CA (US); Hui Chao, San Jose, CA (US); Jason Holloway, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 528 days.

(21) Appl. No.: 17/518,437

(22) Filed: Nov. 3, 2021

(65) Prior Publication Data

US 2023/0138779 A1   May 4, 2023

(51) Int. Cl.
*G06T 5/50* (2006.01)
*G06F 18/25* (2023.01)
(Continued)

(52) U.S. Cl.
CPC .............. *G06T 5/80* (2024.01); *G06F 18/251* (2023.01); *G06T 3/18* (2024.01); *G06T 5/50* (2013.01); *G06T 5/70* (2024.01); *G06T 7/33* (2017.01)

(58) Field of Classification Search
CPC .... G06T 5/80; G06T 7/33; G06T 3/18; G06T 5/70; G06T 5/50; G06F 18/251
See application file for complete search history.

(56) References Cited

U.S. PATENT DOCUMENTS 6,173,087 B1 * 1/2001 Kumar .................... G06T 3/153
382/284
9,602,974 B2 * 3/2017 Rudow ................. G01S 19/485
(Continued)

FOREIGN PATENT DOCUMENTS

CN       102881016 B     6/2016
CN       107016646 A     8/2017
(Continued)

OTHER PUBLICATIONS

Ho, T., "Dual-fisheye Lens Stitching for 360-degree Imaging & Video," Electrical Engineering Dept., UT Arlington, Mar. 2017, pp. 1-60.
(Continued)

*Primary Examiner* — Shaghayegh Azima
(74) *Attorney, Agent, or Firm* — Sterne, Kessler, Goldstein & Fox P.L.L.C.

(57) ABSTRACT

Embodiments of the present disclosure relate performing registration of a first image to a second image where the first image is undistorted to linear space before applying a geometric transformation matrix to modify the first image to align with the second image. The geometric transformation matrix may be a linear matrix that causes the undistorted version of the first image to make translation movement, rotational movement or both. The undistorted and modified first image is then reverted back to nonlinear distorted space. Then the reverted first image may be warped to better align with the second image for fusing with the second image. In this way, visual distortions in the fused image such as wobbling may be reduced or eliminated.

20 Claims, 6 Drawing Sheets

(51) Int. Cl.
*G06T 3/18* (2024.01)
*G06T 5/70* (2024.01)
*G06T 5/80* (2024.01)
*G06T 7/33* (2017.01)

(56) References Cited

U.S. PATENT DOCUMENTS

| | | | |
|---|---|---|---|
| 9,866,752 B2 | 1/2018 | Zhang et al. | |
| 10,306,186 B2* | 5/2019 | Chuang | H04N 23/698 |
| 11,025,888 B2 | 6/2021 | Aggarwal et al. | |
| 11,049,218 B2* | 6/2021 | Khwaja | G06T 5/70 |
| 11,056,001 B2* | 7/2021 | Maruyama | G08G 1/165 |
| 11,119,396 B1 | 9/2021 | Lablans | |
| 2009/0220152 A1* | 9/2009 | Tiwari | H04N 19/86 |
| | | | 382/173 |
| 2012/0237137 A1* | 9/2012 | Chen | G06T 5/50 |
| | | | 382/284 |
| 2019/0102868 A1* | 4/2019 | Beric | G06T 3/047 |
| 2019/0158011 A1 | 5/2019 | West et al. | |
| 2019/0258251 A1 | 8/2019 | Ditty et al. | |
| 2020/0012234 A1* | 1/2020 | Li | G02B 27/1006 |
| 2020/0020075 A1* | 1/2020 | Khwaja | G06T 3/4038 |
| 2020/0193641 A1 | 6/2020 | Markkassery | |
| 2020/0380636 A1* | 12/2020 | Dawson | G06T 3/10 |
| 2021/0004933 A1* | 1/2021 | Wong | G06T 7/174 |
| 2021/0125313 A1* | 4/2021 | Bai | G06V 10/806 |
| 2021/0174471 A1 | 6/2021 | Kuang et al. | |
| 2021/0334934 A1* | 10/2021 | Liu | G06T 3/4007 |
| 2022/0036561 A1* | 2/2022 | Liu | G06T 5/70 |
| 2023/0289923 A1* | 9/2023 | Smirnov | G06T 5/20 |
| 2024/0127540 A1* | 4/2024 | Milne | G01N 15/06 |

FOREIGN PATENT DOCUMENTS

| | | |
|---|---|---|
| CN | 104301677 B | 6/2018 |
| CN | 110855903 A | 2/2020 |
| CN | 111553939 A | 8/2020 |
| CN | 113379853 A | 9/2021 |
| KR | 10-1175097 B1 | 8/2012 |

OTHER PUBLICATIONS

Munendra, D.S., "Multiple Images Stitching for Panoramic Image Based on RANSAC and Homography Matrix," Mukt Shabd Journal, vol. IX, Issue VII, Jul. 2020, pp. 351-359.

* cited by examiner

LINEAR TRANSFORM OF UNDISTORTED IMAGE FOR FUSION

BACKGROUND

1. Field of the Disclosure

The present disclosure relates to a circuit for processing images and more specifically to registration and fusion of different images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to modifying a first image to align with a second image by applying transformation that incorporates linear transform. The applied transformation corresponds to a combination of a corrective transformation that undistorts the first image in nonlinear space to linear space, a linear transformation applied to the undistorted first image, and an inverse of the corrective transformation that distorts the linear transformed first image into the nonlinear space. A version of the modified first image is fused with a second image to generate a fused image.

Figure 1:
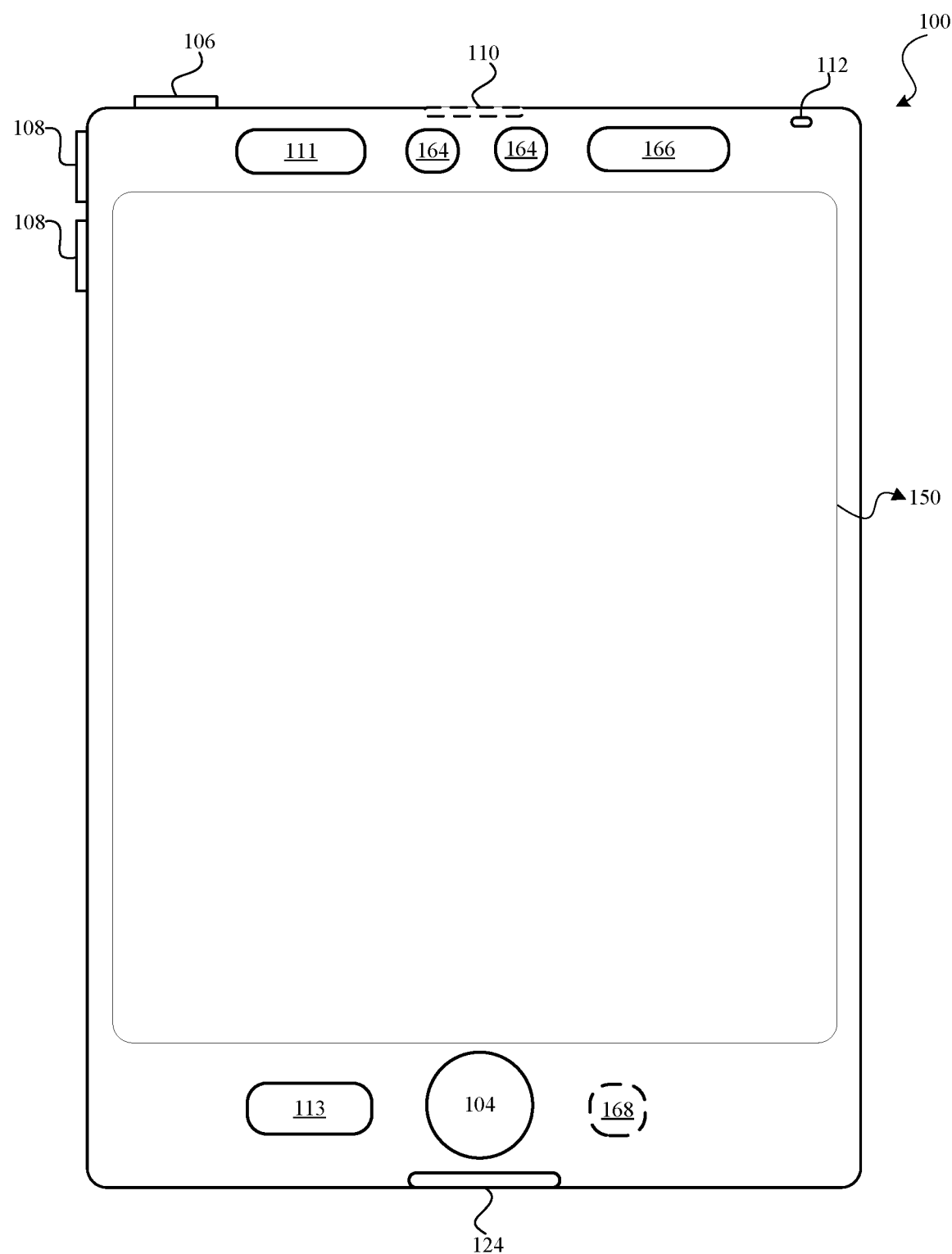
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to performing registration of a first image where the first image is applied with transformation that incorporates a geometric transformation to rotate/translate the first image to align with a second image. The translation also incorporates undistorting the first image in nonlinear space and reverting back the first image processed by the geometric transformation to nonlinear distorted space. Before undistorting the first image, the first image may be locally warped to better align with the second image for fusing with the second image. In this way, visual distortions in the fused image such as wobbling may be reduced or eliminated.

Nonlinear space described herein refers to distorted space in which an image is placed. The distortion may be due to intended or unintended properties of optics associated with an image sensor that captures the image or due to image processing performed on an image. An image in the nonlinear space appears distorted when viewed by a user.

Linear space described herein refers to undistorted space in which an image is placed. The image appears natural and undistorted when viewed by a user. An image in the nonlinear space may be undistorted into the linear space by applying corrective transform to the distorted image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
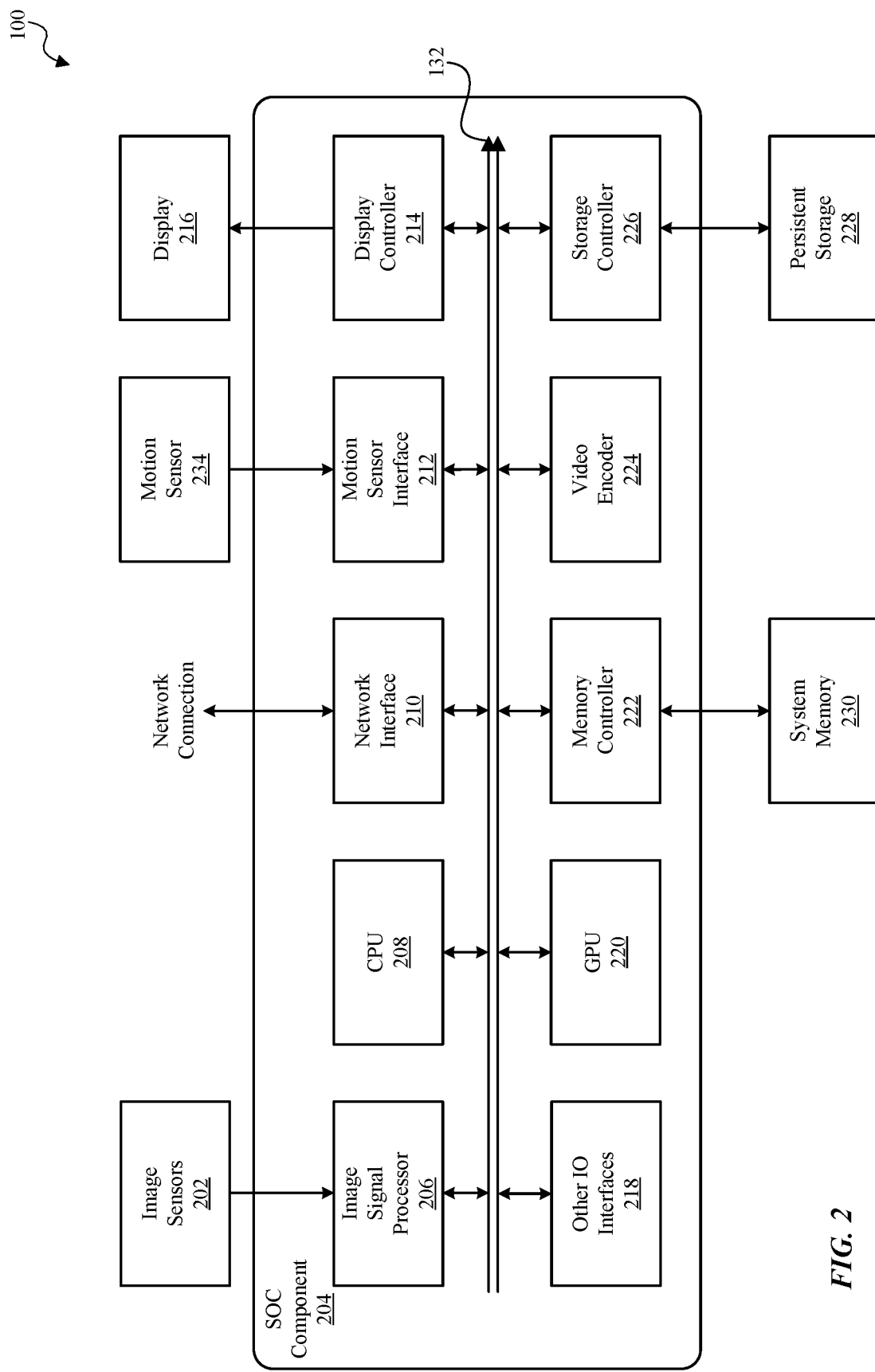
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAIVIBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
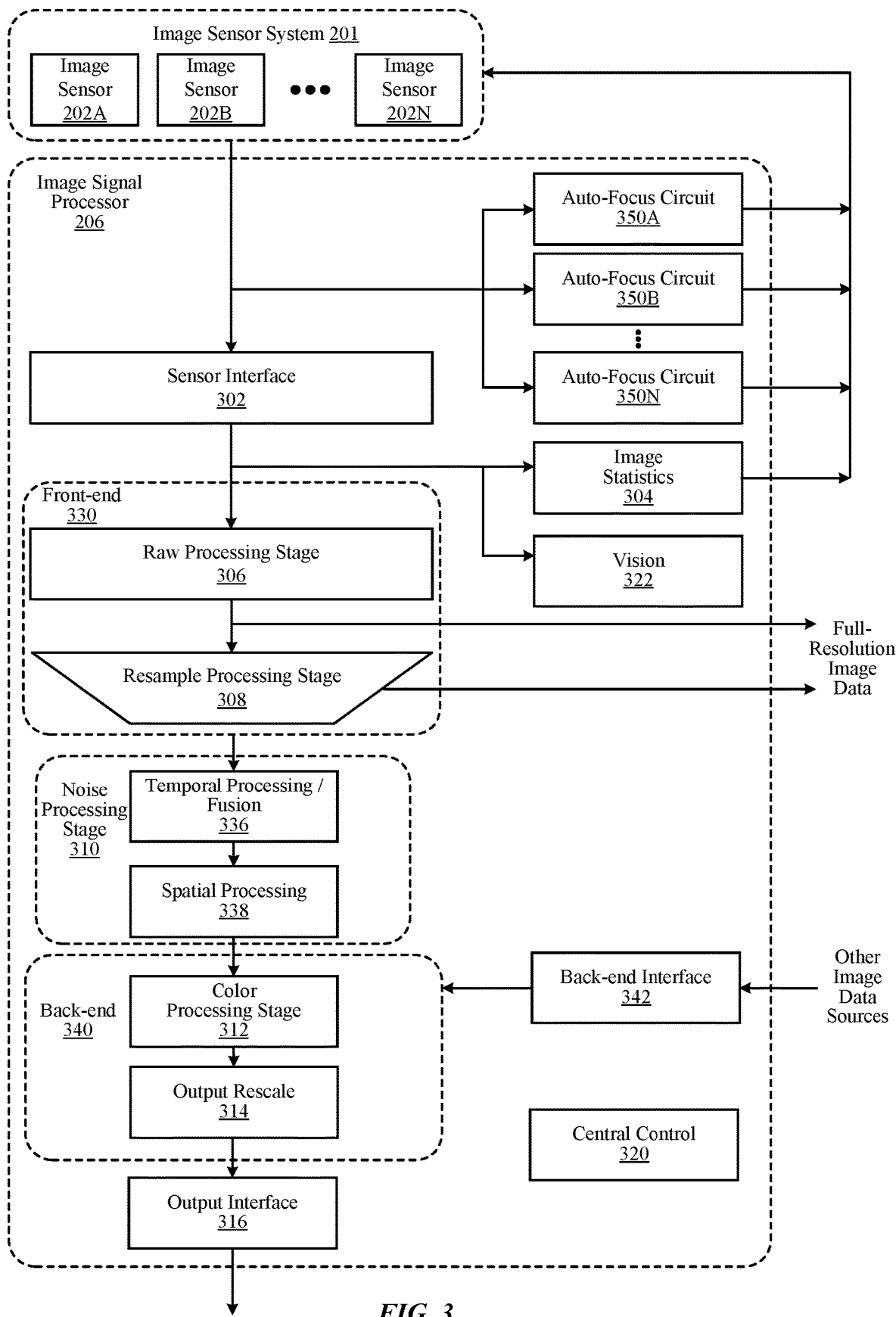
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, noise-processing stage 310, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more of the noise processing stage 310 and/or back-end pipeline stages 340 may process image data at a different rate less than the initial data rate. For example, in the embodiment of FIG. 3, back-end pipeline stages 340 (e.g., color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end stages 330, noise processing stage 310, and back-end stages 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format or Quad Bayer raw format, for example. In Bayer raw image format or Quad Bayer raw format, pixel data with values specific to a particular color (instead of all colors) is provided in each pixel. In an image capturing sensor, image data is typically provided in a Bayer pattern or a Quad Bayer pattern. Raw processing stage 306 may process image data in a Bayer raw format or Quad Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping nonlinear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG), and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. In some embodiments, the noise processing stage 310 comprises a temporal processing and fusion circuit 336 and a spatial processing circuit 338, configured to perform temporal filtering and spatial filtering, respectively, on received image data. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering.

The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. For example, the noise processing stage 310 may perform image fusion by warping and fusing an image frame with a reference frame. In some embodiments, image fusion is performed using image pyramids of received image frames (e.g., generated by the pyramid generator circuit 332). In other embodiments, spatial noise filtering may not be included as part of the temporal loop for temporal filtering (e.g., the spatial noise filter is applied to an image frame after it is stored as a reference image frame and thus the reference frame is not spatially filtered).

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Registration Process

An image registration process described herein refers to the process of determining linear transformation applied to an original image to generate a converted image rotated and/or translated with respect to the original image to better align or match another image. The linear transformation is to be distinguished from local warping where different portions of the image are warped in a different manner to finely align the image with the other image. The image that undergoes the linear transform and/or local warping may be referred to as a "first image" and another image against which the first image is translated, rotated and locally warped to match and align may be referred to herein as a "second image."

When the first image is in distorted nonlinear space where its grid lines are not straight or even, the registration process followed by locally warping and fusion with the second image may result in wobbling artifacts that are pronounced at the edges of the fused image. Such wobbling artifacts are understood to be caused by applying linear transformation to the first image in nonlinear space. Hence, to reduce the wobbling artifacts, embodiments rectify the distortion due to the nonlinear space before applying the linear transformation followed by distorting back the transformed first image to nonlinear space. Because undistorted first image in linear space is applied with nonlinear transformation, the resulting distorted first image does not include deviation or discrepancy due to applying a linear transformation to the first image in nonlinear space.

The first image may be in a distorted nonlinear space due to optics associated with image sensor 202 used in capturing the first image. For example, the first image may be captured using an ultra wide-angle image sensor with a short focal length. In such case, the distortion of the image increases at edge portions further away from the center of the image. Even when a standard lens is used in the image sensor, there may be distortions in the captured image due to various imperfections in the optics. Such distortion renders the captured image to be in nonlinear space. By determining the distortion, identifying and applying corrective transformation function for correcting such distortion and then applying the corrective transformation function to the distorted first image, an undistorted version of the first image may be obtained. The process of applying the corrective transformation function is also referred to as geometric distortion correction. In the following description, the corrective transformation function is assumed to be known (e.g., provided by image sensor manufacturer).

Figure 4:
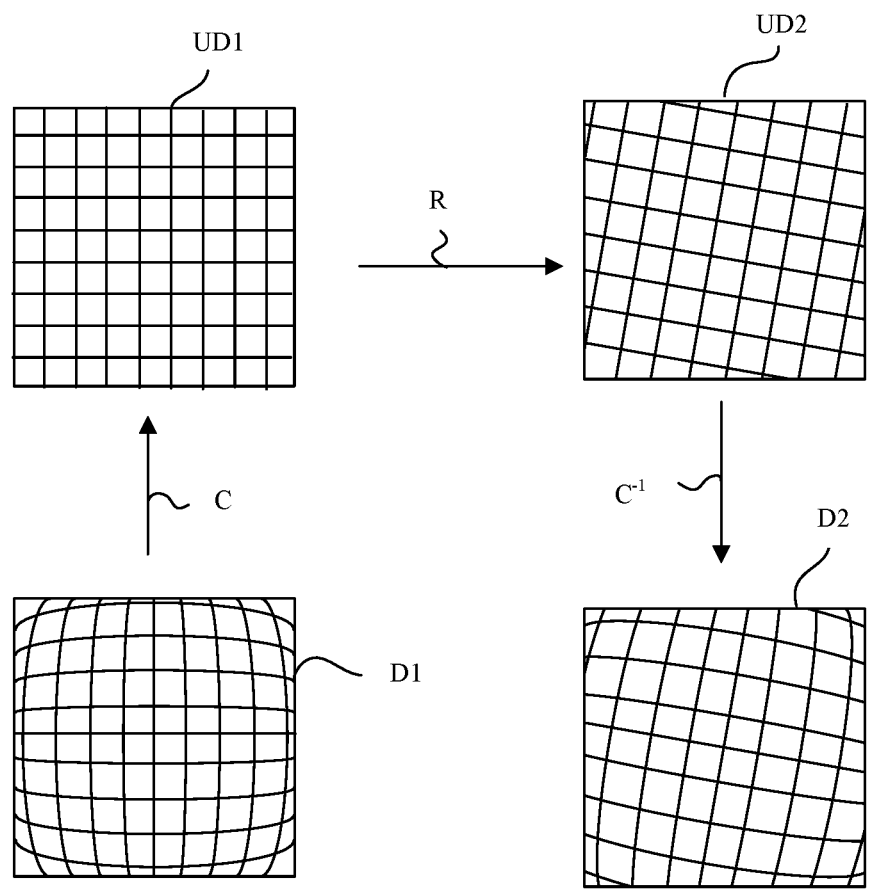
FIG. 4 is a conceptual diagram illustrating a registration process before locally warping a first image, according to one embodiment.

FIG. 4 is a conceptual diagram illustrating the registration process before locally warping first image D1, according to one embodiment. Instead of applying a linear transformation R for registration directly to first image D1 in nonlinear space, first image D1 is first undistorted to image UD1 in linear space by applying corrective transform C. Then, the undistorted image UD1 is applied with linear transformation R to generate a transformed undistorted first image UD2. Then transformed undistorted first image UD2 is distorted back to nonlinear space to generate transformed distorted first image D2 by applying an inverse corrective transform $C^{-1}$.

In FIG. 4, the lines in the interior of first image D1 represent grid lines of nonlinear space. By applying transformation C, first image D1 is converted to undistorted first image UD1 where its grid lines are straight and evenly spaced. The transformed undistorted first image UD2 is rotated and/or translated relative to the undistorted first image UD1, and hence, the grid lines of the undistorted first image UD1 is also straight and evenly spaced. Conversely, transformed distorted first image D2 is in nonlinear space, and hence, its grid lines are shown as being curved and unevenly placed.

The linear transformation may be represented by a linear matrix of a predetermined size. In one or more embodiment, the linear matrix may be a perspective transformation matrix with its coefficient representing 8 degrees of freedom (e.g., translational movements, and rotational movements). The linear matrix may be generated by vision module 322, as described below in detail with reference to FIG. 6.

Although FIG. 4 illustrates corrective transform C, linear transform R and inverse corrective transform $C^{-1}$ as being sequentially applied to first image D1, undistorted first image UD1, and transformed undistorted first image UD1, respectively, a single transform equivalent to the combination of corrective transform C, linear transform R and inverse corrective transform $C^{-1}$ may be used instead. When the single equivalent transform is used, the single transform may be applied to first image D1 to obtain the transformed distorted first image D2 without generating intermediate images (e.g., undistorted first image UD1 and transformed undistorted first image UD2). Skipping the intermediate images is advantageous, among other reasons, because no separate process of storing and retrieving undistorted image UD1 and transformed undistorted first image UD2 is performed.

Example Noise Processing Stage

Figure 5:
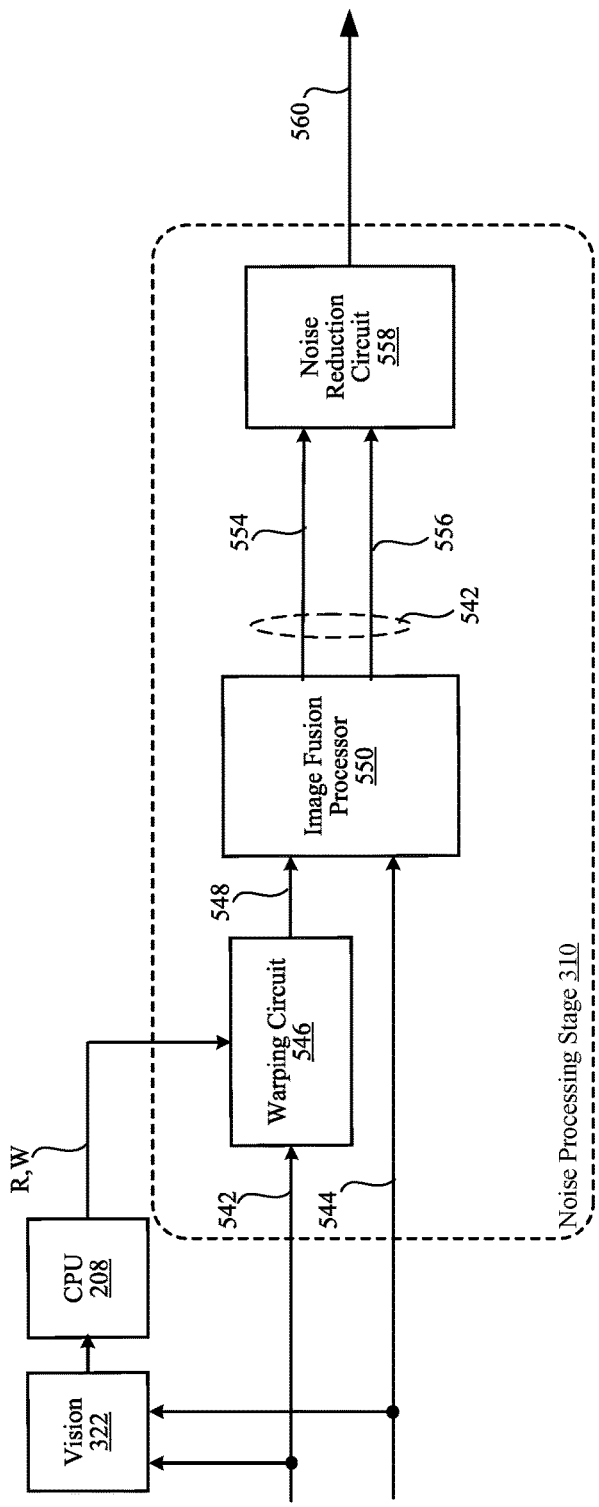
FIG. 5 is a block diagram of a noise processing stage in the image processing pipelines, in accordance with some embodiments.

FIG. 5 is a block diagram illustrating a noise processing stage 310, according to one embodiment. Noise processing stage 310 may performs one or more of temporal and spatial processing on images or pyramids of images. In some embodiments, the noise processing stage 310 comprises an image fusion processor 550 and a noise reduction circuit 558. Noise processing stage 310 receives a first image or a first image pyramid 442 of the first image and a second image or pyramid 444 of second image, and fuses the first and second images or their pyramids (e.g., at the image fusion processor 550) to generate a fused image or a fused image pyramid 542. The fused image or the fused image pyramid 542 is then processed by noise reduction circuit 558 to generate a denoised image 560. In some embodiments, image fusion processor 550 and/or the noise reduction circuit 558 may be bypassed.

In some embodiments, the first, second images or their pyramids 542, 554 are generated by a dedicated circuit (not shown) that performs preprocessing, de-mosaicing, and resampling. In some embodiments, at least one of the first and second images or their pyramids 542 and 544 correspond to a previously fused image or its pyramid (e.g., a previously fused image or pyramid 542). How the first, second images or their pyramids 542 and 544 are received and processed by the noise processing stage 310 may depend upon a current image fusion scheme implemented by ISP 206.

In some embodiments, the noise processing stage 310 uses a warping circuit 546 to warp the first image or its pyramid 542 to spatially aligned with the second image or its pyramid 544 prior to fusing the first and second images or their pyramids, based upon linear transform R and local warping parameters W. Linear transform R and local warping parameters W are determined by an image registration process performed by vision module 322 and CPU 208 to align the first image or its pyramid 542 with those of the second image or its pyramid 544 (which may be referred to as a primary or reference image or pyramid).

Warping circuit 546 modifies the first image or its pyramid 542, as described above with reference to FIG. 4. Warping circuit 546 applies corrective transformation C followed by linear transformation R and then an inverse corrective transformation $C^{-1}$ to the first image or its pyramid 542. Alternatively, vision module 322 in conjunction with CPU 208 generates a single transformation equivalent to sequential applying of transformation C, linear transformation R and inverse transformation $C^{-1}$, and send the equivalent transformation to warping circuit 546. Warping circuit 546 may then apply the single equivalent transformation to the first image or its pyramid 542 to generate modified first image or its pyramid.

The warped image pyramid 548 generated by warping circuit 546 is passed onto image fusion processor 550. Image fusion processor 550 performs per pixel blending between a portion of the warped first image or its pyramid 548 with a portion of the second image or its image pyramid 544 to generate a fused image or its pyramid 542. When a fused pyramid is generated, the fused pyramid includes an unscaled single color image and one or more downscaled images having multiple color components, each downscaled image corresponding to a downscaled version of a previous stage of the fused image pyramid 542. In some embodiments, the fused image pyramid 542 (also referred to as a reconstructed pyramid) may be stored in memory (e.g., a DRAM) for use in subsequent image fusion operations, based upon a current image fusion scheme implemented by the ISP 206. In addition, at least a portion of the fused image pyramid 542 is passed onto the noise reduction circuit 558 for further processing and enhancement (e.g., spatial processing). For example, in some embodiments, the unscaled single color version 554 and a first downscaled stage 556 (corresponding to a first downscaled level of the fused image pyramid 542, and has a pixel resolution equal to a quarter of a pixel resolution of unscaled single color version 554) of the fused image pyramid 542 are passed to the noise reduction circuit 558.

Noise reduction circuit 558 receives the fused image or at least a portion of the fused image pyramid (e.g., unscaled single-color version 554 and first downscaled version 556) and perform noise reduction (e.g., multi-band noise reduction (MBNR)) to obtain a denoised image 560. In some embodiments, the noise reduction circuit 558, in processed image mode, generates a denoised unscaled single-color image (Y component only) and a denoised first downscaled version (having Cb and Cr components), allowing for construction of a full-resolution image with chroma sampled as 4:2:0. In some embodiments, the noise reduction circuit 558 further receives confidence values associated with each pixel of the unscaled single-color version 554 and first downscaled version 556, where an amount of noise reduction performed may be based upon the confidence values of the received images (e.g., a higher confidence value may indicate that less noise reduction is necessary).

Figure 6:
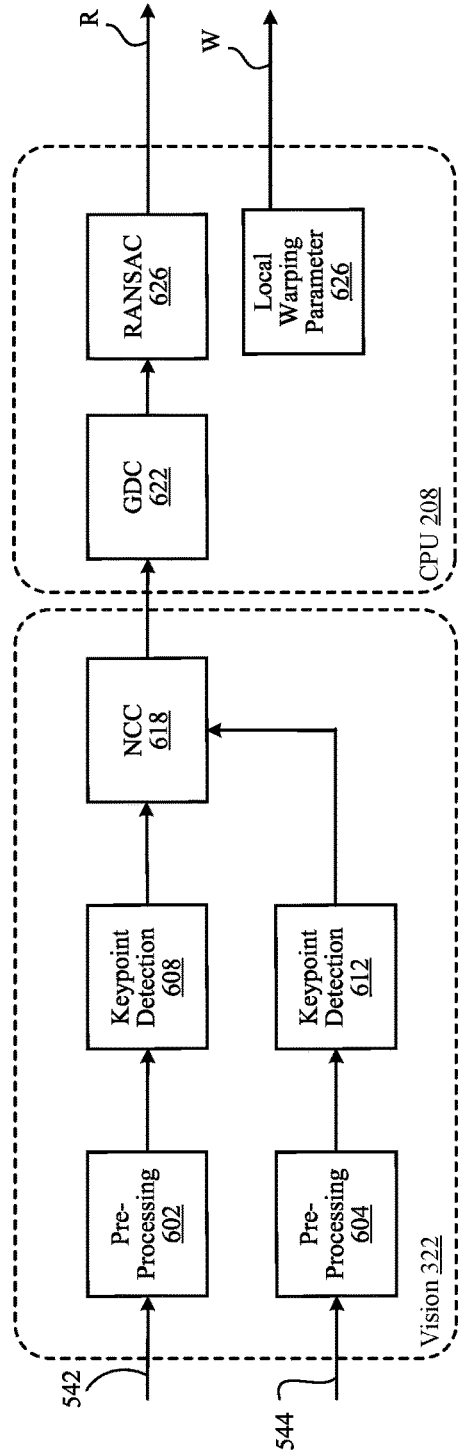
FIG. 6 is a block diagram of a vision module, in accordance with some embodiments.

FIG. 6 is a block diagram of vision module 322, in accordance with some embodiments. In one or more embodiments, vision module 322 may include, among other components, pre-processing modules 602, 604, keypoint detection modules 608, 612 and normalize cross-correlation module 618 embodied as hardware circuits while CPU 208 executes geometric distortion correction (GDC) module 622 and Random Sample Consensus (RANSAC) module 626 embodied as software modules. The implementation of modules in hardware circuits and software modules for these functions may be interchangeable.

Pre-processing modules 602, 604 perform image processing on first image, second image or their pyramids 542, 544 to facilitate keypoint detection. The pre-processing performed in these modules may include downsampling and gaussian filtering.

Keypoint detection modules 608, 612 detects various keypoints in the pre-processed versions of the first image pyramid 542 and the pre-processed versions of the second image pyramid 544. After detecting the keypoints, keypoint detection modules 608, 612 generate binary descriptors of the detected keypoints. Some examples of binary descriptors include FREAK, ORB and BRISK descriptors.

NCC module 618 determines pairs of matching keypoints in first image pyramid 542 and second image pyramid 544 using binary descriptors provided by keypoint detection modules 608, 612.

GDC module 622 converts the coordinates of the matching keypoints to linear space by applying corrective transformation C. Both first and second images or their pyramids 542, 544 are formulated in nonlinear space due to distortions caused by image sensors 202. GDC module 622 applies corrective transformation C to the keypoints in both image pyramids 542, 544 so that the coordinates of the keypoints in these image pyramids are expressed in terms of linear space.

Subsequently, RANSAC module 626 performs RANSAC algorithm to determine linear transformation R that may applied to first image or its pyramid 542 so that it can align and match better with second image or its pyramid 544.

In one or more embodiments, CPU 208 may execute local warping parameter module 626 to generate local warping parameters W for locally warping the first image or its pyramid 542. For this purpose, local warping parameter module 626 may receive data processed by vision module 322 or perform processing independent of data provided by vision module 322.

The processes and sequence of these processes as described with reference to FIG. 6 are merely illustrative.

Example Process for Performing Image Fusion

Figure 7:
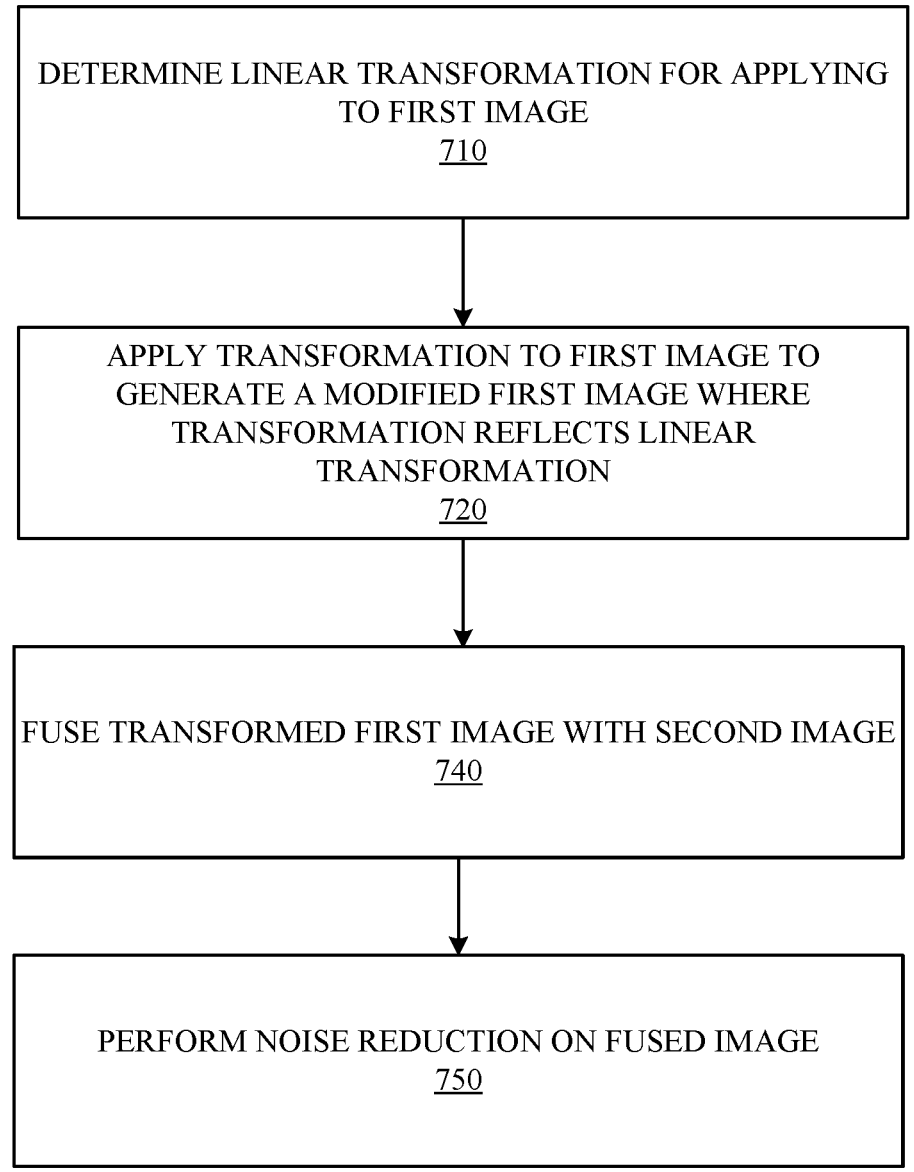
FIG. 7 is a flow chart fusing the first image with a second image, according to one embodiments.

FIG. 7 is a flow chart for fusing a first image with a second image, according to one embodiments. Linear transformation R for applying to an undistorted version of a first image or its pyramid is determined 710 at vision module 322 by detecting keypoints in the first image or its pyramid and a second image or its pyramid to be fused with the first image or its pyramid, determining the correlation of pairs of keypoints in the two images or their pyramids, converting the coordinates of the pairs of keypoints to linear space, and then applying RANSAC algorithm to the coordinates of keypoints in the linear space, as described above with reference to FIG. 6.

A combined transformation to apply to the first image is generated. The combined transformation corresponds to a combination of corrective transform C for converting the first image or its pyramid into linear space, linear transform R, and inverse of the corrective transform for reverting back to the nonlinear space. The combined transformation may be generated at vision module 322, and CPU 208. The combined transformation is then applied 720 to the first image to translate/rotate the first image.

In one or more embodiment, local warping using local warping parameters W may be applied after applying linear transform R and before applying the inverse of the corrective transform $C^{-1}$. Transform operations other than local warping may also be applied after applying linear transform and before applying the inverse of the corrective transform $C^{-1}$. By applying linear transform R and other transform operations, and then applying the inverse of the corrective transform $C^{-1}$, a modified first image is generated.

The modified first image or its pyramid is then fused 740 with a second image or its pyramid to generate a fused image or its pyramid. The second image may be an image captured by an image sensor different from the image sensor capturing the first image, an image captured with the same image sensor as the first image but with a different exposure time, or an image that is result of one or more fusion operations in one or more prior cycles of image processing.

Then noise reduction is performed 750 on the fused image. The noise reduction may include spatial noise reduction. In one or more embodiments where multiple images in image pyramids are fused, a subset of the fused images may undergo the noise reduction process.

Embodiments described above with reference to FIG. 7 are merely illustrative and various change may be made. For example, the process of locally warping the first image or performing subsequent noise reduction on the first image may be omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image signal processor, comprising:
 a warping circuit configured to modify a first image to align with a second image, the warping circuit configured to apply transformation to the first image in nonlinear space to generate a modified first image in the nonlinear space, the applied transformation corresponding to:
  undistorting the first image to linear space by applying corrective transformation,
  applying linear transformation to the undistorted first image, and distorting the linear transformed first image into the modified first image by applying inverse of the corrective transformation; and
 an image fusion processor coupled to the warping circuit, the image fusion processor configured to fuse the modified first image with the second image to generate a fused image.

2. The image signal processor of claim 1, wherein the applied transformation further corresponds to local warping that is applied to the linear transformed first image.

3. The image signal processor of claim 1, wherein the linear transformation is generated by pairing first keypoints detected in the first image and second keypoints detected in the second image, and determining the linear transformation based on spatial relationships between the pairs.

4. The image signal processor of claim 3, wherein locations of the first keypoints and locations of the second keypoints are applied with the corrective transformation before determining the linear transformation.

5. The image fusion processor of claim 1, wherein the linear transformation is represented by a matrix with 8 degrees of freedom.

6. The image fusion processor of claim 1, wherein the first image is part of a first image pyramid, and the second image is a counterpart of the first image in a second image pyramid.

7. The image fusion processor of claim 6, wherein the second image pyramid is a result of fusion by the image fusion processor in a prior cycle.

8. The image fusion processor of claim 7, further comprising a noise reduction circuit configured to receive the fused image and perform spatial noise reduction on the fused image.

9. The image fusion processor of claim 1, wherein the first image is captured by a wide-angle image sensor that results in distortion of the first image to be in the nonlinear space.

10. A method for processing an image, comprising:
 receiving a first image in nonlinear space;
 modifying the first image to align with a second image by applying transformation to the first image to generate a modified first image in the nonlinear space, the applied transformation corresponding to:
  undistorting the first image to linear space by applying corrective transformation,
  applying linear transformation to the undistorted first image, and
  distorting the linear transformed first image into the modified first image in the nonlinear space by applying inverse of the corrective transformation; and
 fusing the modified first image with the second image to generate a fused image.

11. The method of claim 10, wherein the applied transformation further corresponds to local warping that is applied to the linear transformed first image.

12. The method of claim 10, further comprising:
 pairing first keypoints detected in the first image and second keypoints detected in the second image; and
 determining the linear transformation based on spatial relationships between the pairs.

13. The method of claim 12, wherein applying the corrective transformation to locations of the first keypoints and locations of the second keypoints before determining the linear transformation.

14. The method of claim 10, wherein the linear transformation is represented by a matrix with 8 degrees of freedom.

15. The method of claim 10, wherein the first image is part of a first image pyramid, and the second image is a counterpart of the first image in a second image pyramid.

16. The method of claim 15, wherein the second image pyramid is a result of fusion by an image fusion processor in a prior cycle.

17. The method of claim 16, further comprising performing spatial noise reduction on the fused image.

18. The method of claim 10, wherein the first image is captured by a wide-angle image sensor that results in distortion of the first image to be in the nonlinear space.

19. An electronic device, comprising:
 an image sensor configured to capture a first image and a second image; and
 a memory configured to store the first image and the second image; and
 a warping circuit configured to modify the first image to align with the second image, and the warping circuit configured to apply transformation to the first image in nonlinear space to generate a modified first image in the nonlinear space, the applied transformation corresponding to:
  undistorting the first image to linear space by applying corrective transformation,
  applying linear transformation to the undistorted first image, and
  distorting the linear transformed first image into the modified first image by applying inverse of the corrective transformation; and
 an image fusion processor coupled to the warping circuit, the image fusion processor configured to fuse a version of the modified first image with the second image to generate a fused image.

20. The electronic device of claim 19, wherein the applied transformation further corresponds to local warping that is applied to the linear transformed first image.

* * * * *

UNITED STATES PATENT AND TRADEMARK OFFICE
CERTIFICATE OF CORRECTION

PATENT NO. : 12,260,532 B2
APPLICATION NO. : 17/518437
DATED : March 25, 2025
INVENTOR(S) : Liu et al.

It is certified that error appears in the above-identified patent and that said Letters Patent is hereby corrected as shown below:

In the Claims

In Column 17, Claim 1, Lines 29-31, delete "distorting the linear transformed first image into the modified first image by applying inverse of the corrective transformation; and" and insert the same at Line 30, as a new sub-point.

Signed and Sealed this
Twenty-ninth Day of April, 2025

Coke Morgan Stewart
*Acting Director of the United States Patent and Trademark Office*